United States Patent [19]

Julian

[11] Patent Number: 4,937,084

[45] Date of Patent: Jun. 26, 1990

[54] WAFFLE-CUT POTATO PRODUCT

[75] Inventor: John C. Julian, Tualatin, Oreg.

[73] Assignee: Lamb-Weston, Inc., Tri-Cities, Wash.

[21] Appl. No.: 682,366

[22] Filed: Dec. 17, 1984

Related U.S. Application Data

[62] Division of Ser. No. 525,115, Aug. 22, 1983, Pat. No. 4,523,503.

[51] Int. Cl.[5] .......... A23L 1/217

[52] U.S. Cl. .......... 426/144; 426/637; 426/808

[58] Field of Search .......... 426/637, 808, 144

[56] References Cited

U.S. PATENT DOCUMENTS

| | | | |
|---|---|---|---|
| 678,514 | 7/1901 | Regnier | 426/144 |
| 1,937,049 | 11/1933 | Toland et al. | 83/404 X |
| 2,136,319 | 11/1938 | Schmitt | 83/646 X |
| 2,612,453 | 9/1952 | Stahmer | 426/144 X |
| 2,767,752 | 10/1956 | Stahmer | 83/404.1 X |
| 2,769,715 | 11/1956 | Stahmer | 426/144 |
| 3,139,130 | 6/1964 | Orschel et al. | 83/417 X |
| 4,508,739 | 4/1985 | Ryan | 426/144 |
| 4,511,586 | 4/1985 | Fitzwater et al. | 426/144 |

FOREIGN PATENT DOCUMENTS

| | | | |
|---|---|---|---|
| 898057 | 4/1972 | Canada | 426/144 |
| 1506166 | 4/1978 | United Kingdom | 426/637 |

*Primary Examiner*—Arthur L. Corbin

*Attorney, Agent, or Firm*—Klarquist, Sparkman, Campbell, Leigh & Whinston

[57] ABSTRACT

A knife assembly for a potato slicing machine used in slicing potatoes, into waffle or lattice cut sections includes an elongated, corrugated knife and inner and outer clamping members for clamping the knife therebetween. The inner and outer clamping members each have a plurality of parallel, tapered fingers which extend toward a cutting edge of the knife along grooves in one side of the knife, thereby to support both sides of the knife and lift pototo surfaces away from such side and any potential interfering edges which might shear away portions of the cut potato surfaces. A unique potato product formed using such knife assembly is a substantially ellipsoidal section having a peak to peak thickness of about 7/16 inch. The section has opposite sides, each with longitudinal ridges and grooves therebetween. The ridges and grooves of one side are disposed at an angle to those of the other. The section also has a grid of openings formed therein. The product when parfried has a solids content of about 25%-65% and an oils content of about 6%-20%, by weight. The section is prepared from a whole potato by slicing the same with a corrugated knife along two parallel planes but from different cutting direction, to form a potato section of the foregoing shape. The section is then blanched, dried and parfried in oil.

4 Claims, 2 Drawing Sheets

FIG. 4
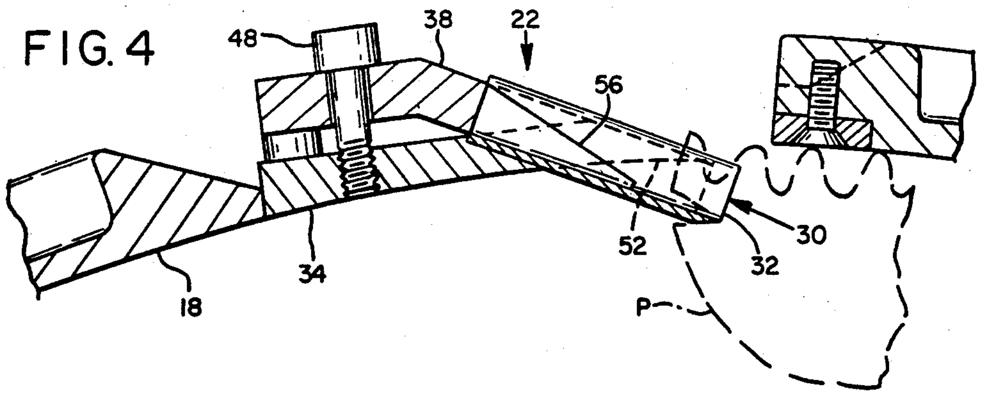
FIG. 5
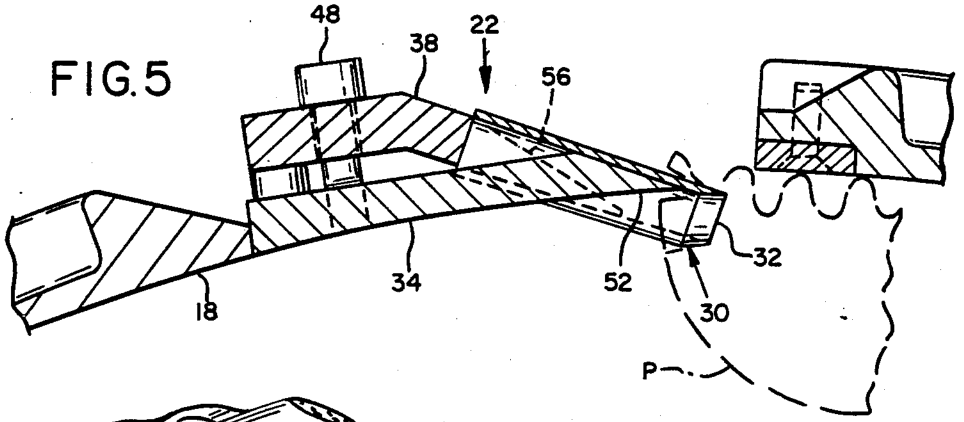
FIG. 6
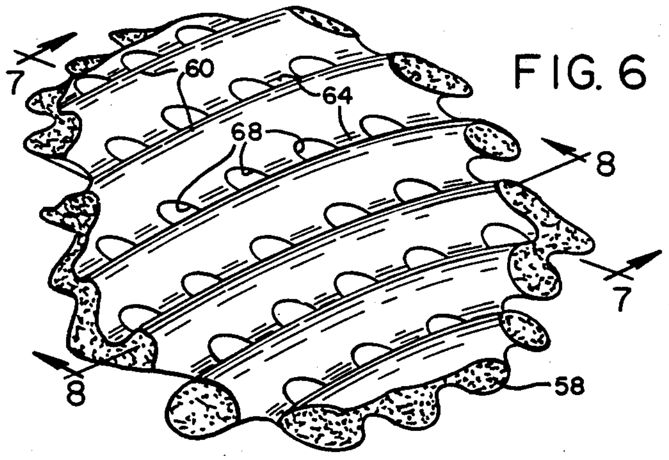
FIG. 7
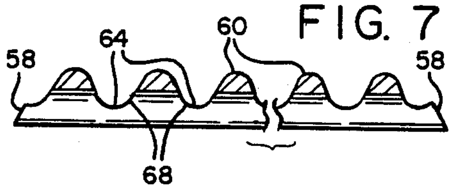
FIG. 8
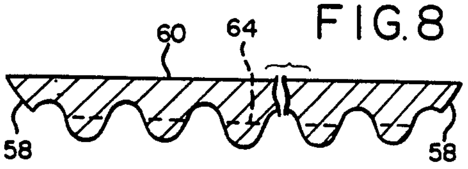
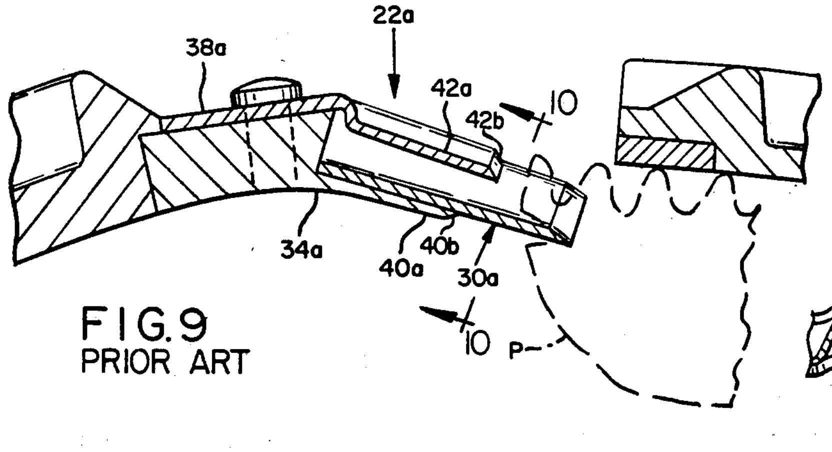
FIG. 9
PRIOR ART
FIG. 10
PRIOR ART
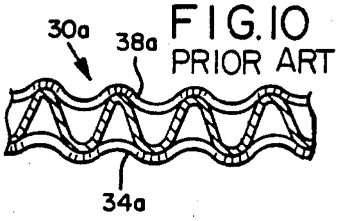

WAFFLE-CUT POTATO PRODUCT

This is a division, of application Ser. No. 525,115, filed Aug. 22, 1983, now U.S. Pat. No. 4,523,503.

The present invention relates generally to food processing, and more particularly to a unique potato product and apparatus and process for making the same.

BACKGROUND OF THE INVENTION

Traditionally, deep-fried ("french-fried") potato products are processed in the form of rectangular or square julienne-type strips, slices or wedge cuts. Such products typically are processed by cutting whole potatoes into pieces of the desired shape, and then blanching, parfrying and freezing the pieces. When reconstituted by oil frying, such products characteristically have an oil content of about 10–20% and a solids content of about 40–65% (including oils), by weight.

Such french-fried potato products generally fall into one of two categories, a "shoe string" cut with a thickness in the range of about 3/16-¼ inch, or thicker "steak" cut with a thickness in the range of 3/8-½ inch. French-fried shoe string strips are crisper and have a higher oils content than steak cut strips. The latter, however, have a stronger potato flavor.

Potato products having a "waffle" or "lattice" cut have also been produced, but such products have been limited to thin, potato chip-type products. A waffle-cut potato chip characteristically has longitudinal ridges and grooves formed in both cut surfaces to give it a "corrugated" shape. At least one commercially available product has ridges and grooves on one surface that are perpendicular to the ridges and grooves on the opposite surface. The grooves are sufficiently deep such that the grooves of one cut surface intersect those of the other cut surface to form a grid of openings in the chip. A potato chip of this type is shown in FIG. 18 of Urschel et al., U.S. Pat. Nos. 3,139,127 and 3,139,130. Another is shown in FIG. 8 of Toland et al., U.S. Pat. No. 1,937,049.

Potato chips, including those of the waffle-cut type, typically are processed by cutting whole potatoes into thin wafers or chips, parfrying them, and finally degreasing the chips. They typically have a thickness of about 1/16 inch. They also characteristically have an oil content of about 30–40%, and a solids content of about 90–98% (including oils), by weight, and are consumed as a dry snack food.

Potato chips are much crisper than even french-fried shoe string potato strips, but they are also much more fragile than the latter and therefore pose special packaging and transportation problems. Aside from their superior structural strength, shoe string potato strips, as well as steak cut strips, have a much stronger, full-bodied potato flavor than potato chips. Potato chips, french-fried shoe string strips and french-fried steak cut strips each have their own niche in the food product market; the virtues of one are not necessarily preferable to the virtues of the others. However, heretofore no one has been able successfully to combine the virtues of these products, primarily because of inherent limitations in existing potato slicing equipment.

The only known commercially available potato slicing machine for making waffle-cut potato chips is substantially like that shown in Urschel Patent Nos. 3,139,127 and 3,139,130, manufactured by Urschel Laboratories, Inc., Valparaiso, Indiana, as model "CCL".

In operation, whole potatoes are received by a central, rotating carriage and fed outwardly by centrifugal force into one of several radial guides which simultaneously rotate and direct the potatoes to a stationary cutting assembly surrounding the carriage. The cutting assembly includes a plurality of circumferentially spaced, corrugated knives that project into the path of the orbiting potatoes to cut away thin slices of the potatoes, shunting the slices tangentially away from the cutting assembly. Means are provided to cause the guides, and hence the potato(es) carried therein, to rotate 90° in between cuts. In this way, the corrugated knives slice the potatoes into thin potato slices having ridges and grooves on one side that are perpendicular to the ridges and grooves on the other side. Because the slices are so thin, even a corrugated knife having a relatively flat amplitude slices through the grooves of the previous cut to provide a grid-like pattern of openings in the potato slices.

The Urschel patents teach that the thickness of the potato slices, as well as the size of the openings in the slice, can be varied by changing the size of the corrugated knives and/or the size of openings in the cutting assembly through which the slices are tangentially shunted. However, there are critical inherent limitations. Once the thickness of the slice reaches about ⅛ inch (a "thick" potato chip), the amplitude of the corrugated knife necessary to cut a potato slice with openings becomes large enough such that inner and outer clamping members clamping opposite sides of the knife begin shearing away the ridges of any adjacent exposed cut surface. Thus, the leading edge of the inner clamping member shears away most of the ridges just cut in the exposed cut surface of the orbiting potato, which eventually forms one surface of the potato slice. And, the leading edge of the outer clamping member shears away most of the ridges of the other surface of the potato slice as it is shunted tangentially away from the cutting assembly.

The resulting potato slices are totally unacceptable for processing as potato chips. The problem is only exacerbated as the thickness of the product is increased.

Accordingly, there is a need for a potato product having characteristics of both french-fried shoe string and steak cut strips, and to a lesser extent potato chips, and a machine and process for making the same.

It is therefore one object of the invention to provide a potato product having an enhanced full-bodied potato flavor and fried character, as well as portions with a crisp texture characteristic of potato chips.

A second object of the invention is to provide a potato product having a unique taste and character.

Another object of the invention is to provide a potato product having characteristics of both french-fried shoe string and steak cut strips, and to a lesser degree potato chips.

An additional object of the invention is to provide a waffle-cut potato product suitable for processing as a deep-fried (french-fried) potato product.

A further object of the invention is to provide a process for preparing a waffle-cut potato product having a unique taste and texture when consumed.

Yet another object of the invention is to provide an apparatus for slicing potatoes into thick waffle-cut sections having a grid of openings, without shearing off any ridges during slicing.

Still another object of the invention is to provide an apparatus, as aforesaid, that is economical and maintains the production capacity of conventional potato slicing apparatus.

Other objects and advantages of the invention will become apparent from the drawings and following detailed description.

SUMMARY OF THE INVENTION

In accordance with the foregoing objects, the present invention is an improved knife assembly for mounting to an Urschel brand potato slicing machine or the like. It includes an elongated knife having a corrugated cutting edge and opposed inner and outer sides. Each side has spaced, longitudinal ridges extending perpendicularly to the cutting edge and longitudinal grooves therebetween. It further includes a knife holding means for rigidly mounting the knife to a stationary cutting assembly of the machine. The knife holding means has a plurality of fingers extending toward the cutting edge of the knife along the grooves of one of the inner and outer sides to support the knife. In a preferred form of the invention, the knife holding means includes inner and outer clamping members, both having a plurality of tapered fingers extending into the grooves on one side or the other of the knife to grip the knife firmly therebetween, thereby to act as an inclined plane to pry cut potato surfaces away from the sides of the knife and any edges capable of shearing away ridges cut in such surfaces.

The present invention also comprises a process for making a waffle-cut potato product including the step of slicing a potato with a corrugated knife to expose a first cut surface having longitudinal ridges and grooves therebetween. The potato is then sliced with a corrugated knife along a plane parallel to the first cut surface to cut away a substantially ellipsoidal potato section having (1) a thickness of about 4/16 to 10/16 inch, and (2) a second cut surface opposite the first surface with longitudinal ridges and grooves extending angularly to the ridges and grooves of the first surface. The potato section is subsequently blanched and dried to remove surface moisture. The dried potato section is parfried in oil and, if necessary for transportation, frozen. The parfried section has an oil content of 6–20%, by weight, and a solids content of about 32–40% by weight. Before consumption it is finish fried in hot oil.

The foregoing process and knife assembly are used in the preparation of a unique potato product, which is also part of the present invention. Such product comprises a substantially ellipsoidal potato section having a thickness of about 4/16–10/16 inch. The section has opposed first and second sides, each having spaced longitudinal ridges and grooves therebetween. The ridges and grooves of the first side are angularly disposed to the ridges and grooves of the second side. The grooves of both sides are sufficiently deep such that they intersect one another to form a grid of openings in the product.

BRIEF DESCRIPTION OF THE DRAWINGS

In the drawings:

FIG. 4 is a cross section taken along line 4—4 of FIG. 3.

FIG. 5 is a cross section taken along line 5—5 of FIG. 3.

FIG. 6 is a perspective view of a waffle-cut potato product in accordance with the present invention.

FIG. 7 is a cross section taken along line 7—7 of FIG. 6.

FIG. 8 is a cross section taken along line 8—8 of FIG. 6.

FIG. 9 is a cross section of the Urschel knife assembly, as it would appear with a corrugated knife having a peak to peak amplitude greater than ⅛ inch.

FIG. 10 is a cross section taken along line 10—10 of FIG. 9.

DETAILED DESCRIPTION OF A PREFERRED EMBODIMENT

Environment of the Invention

The knife assembly comprising part of the present invention is an improvement of the knife assembly used with the food slicing machine substantially like that shown in Urschel et al., U.S. Pat. Nos. 3,139,137 and 3,139,130, manufactured by Urschel Laboratories as model "CCL". This machine is used commercially to make potato chips of the lattice or waffle-cut type. The subject matter of these patents is herein incorporated by reference. Only so much of the old construction will be described as is deemed necessary for a proper understanding of the present invention.

Figure 2:
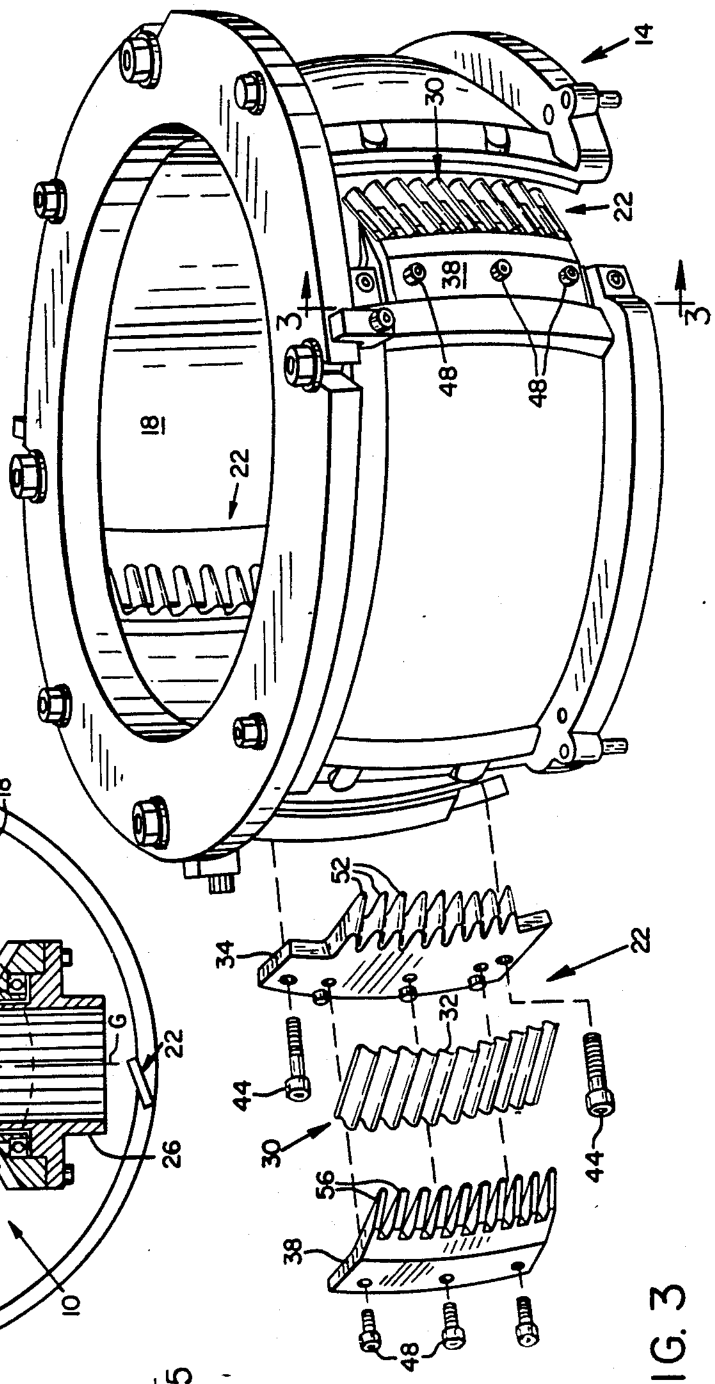
FIG. 2 is an enlarged perspective view of a cutting assembly of the machine of FIG. 1, showing one of the knife assemblies in exploded form.
Figure 1:
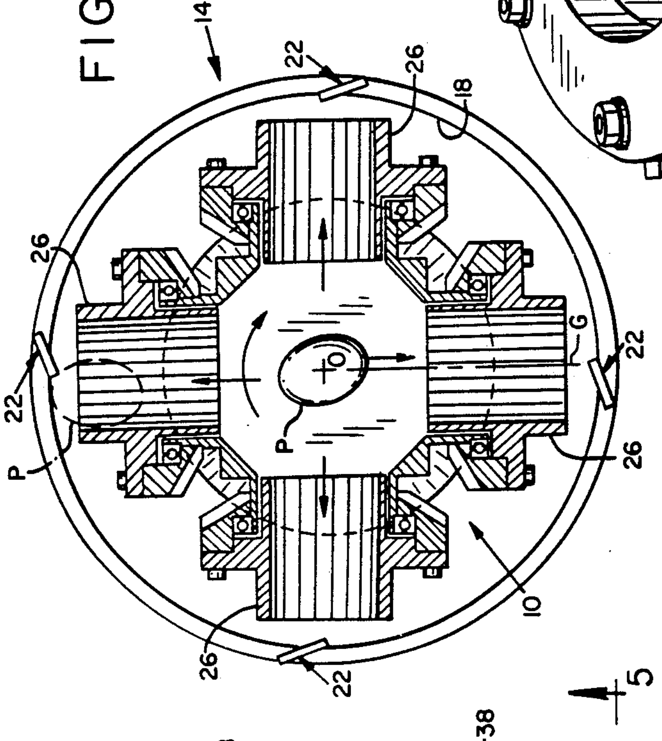
FIG. 1 is a horizontal cross section of the Urschel potato slicing machine, incorporating knife assemblies in accordance with the present invention.
Figure 3:
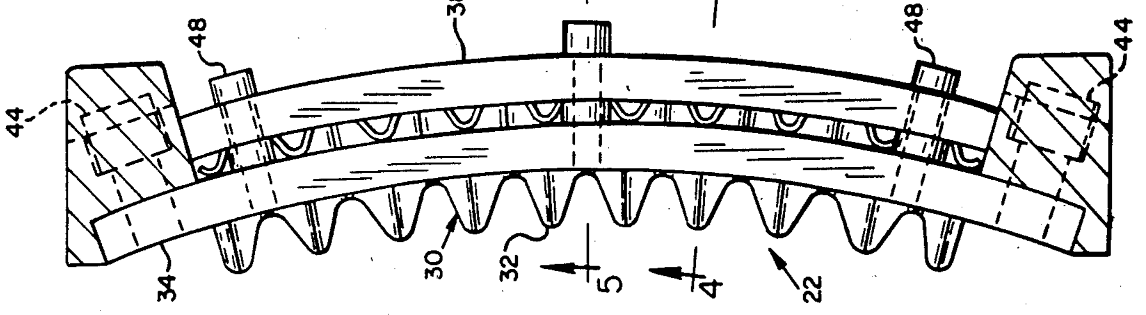
FIG. 3 is a cross section taken along line 3—3 of FIG. 2.

Referring particularly to FIG. 1, the slicing machine includes a rotatable carriage 10 and stationary cutting assembly 14 surrounding carriage 10, both of which are mounted to a frame (not shown). Cutting assembly 14 has a spherically curved inner surface 18, although the cutting assembly can be described as substantially annular in shape. Mounted to the cutting assembly are four circumferentially spaced knife assemblies 22 positioned 90° apart, each having a corrugated knife.

Carriage 10 has four radial guides 26, also spaced 90° apart, each of which rotates about its own radial axis as the carriage rotates. Thus, as the carriage rotates about an axis "O", each guide 26 simultaneously rotates about its own radial axis "G". Gearing means is provided such that each guide rotates once about its own axis for every revolution of the carriage.

In operation, potatoes are fed into a central opening at the top of the carriage, whereupon they move outwardly by centrifugal force into one of the guides, eventually abutting against inner surface 18. The knife assemblies 22 project into the path of the orbiting potatoes to slice off substantially ellipsoidal sections as they pass by. The knife assemblies shunt the sections through tangential gaps in the cutting assembly. Longitudinal ribs (not shown) along the inner surfaces of the guides prevent the potatoes from tumbling therein, thereby to maintain the potatoes against the inner surface of the guides to insure that the potatoes undergo a 90° rotation about axis "G" in between cuts. In this way, each sliced section has ridges and grooves on one side that are disposed perpendicularly to ridges and grooves on the other side.

Prior Art Knife Assembly

Referring to FIGS. 9 and 10, the Urschel knife assembly, designated by the reference numeral *22a*, includes a corrugated knife *30a* and inner and outer clamping members 34*a*, 38*a*. Clamping members 34*a*, 38*a* each have corrugated gripping portions 40*a*, 42*a*, respectively, which grip knife 30*a* therebetween. Gripping portions 40*a*, 42*a* conform well to relatively flat corrugated knives used in making thin waffle-cut potato chips having a thickness less than ⅛ inch. However, if the peak to peak amplitude of the corrugated knife is increased beyond the ⅛ inch limit to produce thicker cuts (while maintaining the grid-like pattern of openings), the gripping portions conform poorly to the corrugated knife, as FIG. 10 illustrates. Consequently, leading edges 40*b*, 42*b* of the gripping portions 40*a*, 42*a*, respectively, shear off the adjacent ridges of any proximate cut potato surface, as FIG. 9 illustrates for the sliced away section of an orbiting potato P.

In brief, the shearing problem is a function of several variables, namely, the length, amplitude and cutting angle of the knife. The angular velocity of the potato may also be a factor. As the amplitude of the knife increases, the possibility of the leading edges 40*b*, 42*b* of the clamping members interfering with the path of a cut potato surface becomes more pronounced. As the length of the blade increases, the possibility of interference becomes less pronounced. Finally, as the cutting angle of the knife increases, the possibility of interference by the inner clamping member with the path of the orbiting potato decreases, but the possibility of interference by the outer clamping member with the tangentially shunted potato section increases.

More specifically, the cutting edge of the knife, because of its cutting angle, exerts a force on the exposed cut surface of the orbiting potato having a substantial shearing (tangential) component and a small radially inward component. The latter component serves to push the leading edge of the cut surface away from the knife and the potentially interfering edge of the inner clamping member. Similarly, the sliced potato section is urged outwardly away from the knife and the potentially interfering edge of the outer clamping member by its own centrifugal force as it passes through the gap in the cutting assembly. When the amplitude of the corrugated knife is small, less than ⅛ inch, these forces are sufficient to cause the potato and potato section to clear the potentially interfering edges of the clamping members, which closely follow the corrugated profile of the knife. However, once the amplitude of the knife exceeds about ⅛ inch, such forces are insufficient to cause the orbiting potato and potato section to clear the interfering leading edges of the clamping members. This problem can be avoided by making the knife longer, thereby enabling such forces to operate on a longer moment arm, but the entire cutting assembly would have to be redesigned to accommodate the longer knife.

Knife Assembly of Present Invention

The knife assembly shown in FIGS. 2–5, designated by the reference numeral 22, solves the foregoing problem without requiring substantial modification of cutting assembly 14. It includes a knife holding means having inner and outer clamping members 34, 38 for clamping an elongated, corrugated knife 30 therebetween. Knife 30 has a corrugated cutting edge 32. The knife preferably has an overall spherical curvature that corresponds to that of inner surface 18. Clamping member 34 is secured to the cutting assembly by fastening means 44 in a conventional manner. Clamping member 38 is secured to inner clamping member 34 by fastening means 48, also in a conventional manner.

Clamping members 34, 38 each have a plurality of parallel, tapered fingers 52, 56, respectively, extending therefrom. These fingers matingly engage the grooves on opposite sides of the knife, extending towards the cutting edge of the knife but terminating short thereof. As shown in FIGS. 4 and 5, the fingers taper to thin tips which rest flush against the bottom of the grooves. The fingers therefore provide an inclined plane for lifting or prying the cut surface of an orbiting potato or a sliced potato section away from the knife and any potentially interferring edges which might shear off the ridges of the cut surface. The fingers also serve rigidly to support both sides of the knife along most of its length.

Process

In accordance with the present invention, whole potatoes of the Russet Burbank variety are sized to select those preferably having a minor diameter of about 1⅞ to 3½ inches. The selected potatoes are trimmed of defects and washed in a water spray or by some other technique well known in the art. The largest potatoes in length are sliced in half to minimize possible plugging problems with slicing equipment later on.

The potatoes preferably are not peeled to give the final product an enhanced potato flavor. The potatoes are subsequently preheated at a temperature within the range of about 100° F. to 120° F. for about 15 to 25 minutes to prevent the potatoes from "feathering" or shattering during slicing. The potatoes are then sliced with corrugated knives into substantially ellipsoidal sections, using the previously described slicing machine and knife assembly. Adjustable shoes or sections to which the knife assemblies are mounted are set to slice the potatoes into sections having a thickness of about 4/16 to 10/16 inch, and preferably about 7/16 inch, as measured from peak to peak.

The sections are cut by slicing the potato to expose a first cut surface having spaced, longitudinal ridges and grooves therebetween, and then slicing the potato along a plane parallel to the first cut surface, at the desired thickness, to cut away the section and expose a second cut surface opposite the first surface. In the short time between such cuts, the potato is reoriented such that the ridges and grooves of the second cut surface are disposed at about a 90° angle to the ridges and grooves of the first cut surface, thereby to form a grid of generally circular openings in the cut away potato section.

The potato sections are conveyed on a screen to remove small pieces. Those with excessive defects are removed at this time. The remaining sections are blanched at a temperature within the range of about 160° F. to about 212° F. for about 2 to 15 minutes to kill enzymes present therein and to gelatinize the starch. The blanched sections are subsequently treated in a flume containing preservatives and color brighteners, such as sodium acid pyrophosphate (SAPP).

Thereafter, the sections are dried to remove surface moisture and then parfried in hot oil at a temperature of about 350° F. to 380° F. for about 30–180 seconds. If prepared according to the foregoing parameters, the parfried sections will have a solids content of about 32–40%, by weight, including about 6–20% oils. For purposes of storage and/or shipment, the sections are frozen in a conventional manner.

The frozen sections are reconstituted by frying them in oil at a temperature within the range of about 340° F. to 360° F. for about 135 to 165 seconds, or by other conventional methods. The final oil fried sections have a solids content of about 55–65%, by weight, including about 12–20% oils.

Waffle-Cut Potato Product

As shown in FIGS. 6–8, the resulting deep-fried waffle-cut potato product has a substantially ellipsoidal shape. It has a uniformly golden coloration, although an outer edge 58 tends to be darker than the rest of the product because of the peel. Both sides of the product have parallel ridges 60 and grooves 64 therebetween, with the ridges and grooves of one side being disposed at an angle of about 90° to the ridges and grooves of the other side. The depth of the grooves is determined by the amplitude of the knives used in slicing the potatoes, and is such that the grooves of one side intersect those of the other side to form a grid of openings 68 in the product. The product has a thickness within the range of about 4/16 to 10/16 inch, with a preferred thickness of about 7/16 inch. The spacing between adjacent ridges is preferably about 28/100 inch.

While the overall peak to peak thickness of the product preferably is about 7/16 inch, it will be appreciated that the thickness of the product actually varies from one portion to the next. Portions adjacent the openings have a nominal thickness, while portions defined by intersecting ridges have a thickness of about 7/16 inch. Some edges of the product have a nominal thickness, while portions defined by the ridge of one side bridging the groove of the other side have a thickness of about 3/16 inch.

This unique configuration causes the product to have a surprisingly desirable taste and texture. The "thickest" portions of the product give it a mealy texture and strong potato flavor similar to that of french-fried steak cut potato strips. Other portions of the product have characteristics similar to that of french-fried shoe string potato strips. And the "thinnest" portions of the product give it a crisp, locally increased oil flavor akin to that of potato chips, even though the overall oil content of the product is about the same as that for a french-fried shoe string potato strip. The resulting product therefore combines the taste, texture and oil characteristics of steak cut potato strips, shoe string potato strips and to a lesser extent potato chips, giving the product a surprisingly very distinctive taste and texture.

Example

Russet-type potatoes were sized to select those having a minor diameter of about 1¾ to 3½ inches, trimmed and washed with the peel. The largest potatoes in length were sliced in half. The potatoes were conditioned by preheating them at a temperature of about 110° F. for about 20 minutes.

The potatoes were then sliced into waffle-cut sections using a modified Urschel slicing machine, model CCL, having a knife assembly in accordance with the present invention. The Urschel machine was modified by shortening slightly the radial guides and shortening the tail end of the slicing shoes, thereby to accommodate longer knives. The cutting angle of the knives was set at about 36°. The knives had a pitch of about 46/100 inch and blade thickness of about 2/100 inch. The peak to peak amplitude of the knives was 30/100 inch. The fingers of the outer clamping member formed an inclined plane with their associated grooves of about 11°. The fingers of the inner clamping member formed an inclined plane with their associated grooves of about 25°. The shoes of the slicing machine were set to cut sections having a thickness of about 7/16 inch.

The cut potato sections were conveyed on a screen to remove small pieces and inspected for defects. The acceptable sections were blanched at a temperature of about 180° F. for about 7 minutes, after which they were dipped for about 20 seconds in a flume containing about 0.75% SAPP. The treated sections were dried in warm air for a short period to remove surface moisture. Thereafter, the sections were parfried in hot oil at a temperature of about 360° F. for about 45 seconds, and frozen.

The frozen sections were reconstituted by frying them in oil at a temperature of about 360° F. for about 2½ minutes. The resulting product had a golden outer surface, portions with fluffy potato interiors, portions with a crisp, relatively oily taste and texture and overall pleasing taste. They had an average solids content of about 64%, including about 17% oils, as compared to a solids content of about 38% after parfrying, including about 7% oils.

Having illustrated and described the principles involved in this invention by what it presently and preferred embodiment and several suggested alternatives, it should be apparent to those persons skilled in the art that such embodiments may be modified in the arrangement and detail without departing from such principles. We claim as our invention all such modifications as come within the true spirit and scope of the invention as defined by the following claims.

We claim:

1. A parfried potato product, suitable for reconstitution by cooking, comprising:

a frozen, sliced potato section having a substantially ellipsoidal shape and a variable thickness, including a peak to peak thickness within the range of about 4/16 to 10/16 inch;

the section including opposed first and second sides, each side having longitudinal ridges and grooves therebetween, the ridges and grooves of the first side extending angularly to the ridges and grooves of the second side;

the grooves of the first and second sides having a depth sufficient to intersect one another to form a grid of openings in the potato section;

the section, before reconstitution, having an oil content of about 6–20%, by weight, and a solids content of about 32–40%, by weight;

whereby the product, upon reconstitution by cooking, is characterized by very thin, crisp portions of locally increased oil flavor adjacent the openings, relatively thick portions defined by intersecting ridges having an internal mealy texture and strong potato flavor similar to thick-cut french fried potato strips, and portions of intermediate thickness whose characteristics are similar to french fried shoe string potato strips.

2. The product of claim 1 wherein the section has an oil content of about 16–20%, by weight, and a solids content of about 55–65%, by weight, after oil fry reconstitution at a temperature within the range of about 350° F. to 360° F. for about 135–165 seconds.

3. The product of claim 1 wherein the section has an oil content of about 16–20%, by weight, and a solids content of about 55–65%, by weight, after reconstitution, whereby the thickest portions of the product have characteristics akin to thick-cut french fried potato strips, the thinnest portions have characteristics akin to potato chips and other portions have characteristics akin to french fried shoe string potato strips.

4. The product of claim 1 wherein the peak-to-peak thickness is about 7/16 inch.

* * * * *

UNITED STATES PATENT AND TRADEMARK OFFICE
CERTIFICATE OF CORRECTION

PATENT NO. : 4,937,084

DATED : June 26, 1990

INVENTOR(S) : John C. Julian, Jerry L. Sloan, Lee A. Wheeler

It is certified that error appears in the above-identified patent and that said Letters Patent is hereby corrected as shown below:

Title page:

The "Inventor" section should read as follows:

John C. Julian, Richland, Washington; Jerry L. Sloan, Richland, Washington; and Lee A. Wheeler, Richland, Washington.

Item [19] should read --Julian et al--

Signed and Sealed this

Twenty-fifth Day of February, 1992

*Attest:*

HARRY F. MANBECK, JR.

*Attesting Officer*

*Commissioner of Patents and Trademarks*